(12) United States Patent
Biancalana

(10) Patent No.: US 10,906,597 B2
(45) Date of Patent: Feb. 2, 2021

(54) CAR HAVING AN ENHANCED FRONT AERODYNAMIC LOAD

(71) Applicant: FERRARI S.p.A., Modena (IT)

(72) Inventor: Matteo Biancalana, Modena (IT)

(73) Assignee: FERRARI S.p.A., Modena (IT)

( * ) Notice: Subject to any disclaimer, the term of this patent is extended or adjusted under 35 U.S.C. 154(b) by 79 days.

(21) Appl. No.: 16/256,870

(22) Filed: Jan. 24, 2019

(65) Prior Publication Data
US 2019/0233022 A1 Aug. 1, 2019

(30) Foreign Application Priority Data
Jan. 26, 2018 (IT) .................... 102018000002048

(51) Int. Cl.
*B62D 35/00* (2006.01)
*B62D 25/12* (2006.01)
*B62D 37/02* (2006.01)

(52) U.S. Cl.
CPC ........... *B62D 35/005* (2013.01); *B62D 25/12* (2013.01); *B62D 35/00* (2013.01); *B62D 37/02* (2013.01)

(58) Field of Classification Search
CPC ...... B62D 35/00; B62D 35/005; B62D 25/12; B62D 37/02
USPC ..................................................... 296/180.1
See application file for complete search history.

(56) References Cited

U.S. PATENT DOCUMENTS

| 5,184,832 A | * | 2/1993 | Miwa | ................... | B62D 35/005 |
| | | | | | 296/198 |
| 8,210,600 B1 | * | 7/2012 | Verhee | ................. | B62D 35/005 |
| | | | | | 296/180.1 |
| 2012/0292122 A1 | | 11/2012 | Verbrugge | | |

FOREIGN PATENT DOCUMENTS

| CA | 2698896 A1 | 10/2011 |
| DE | 2841141 A1 | 4/1980 |
| WO | 2017037251 A1 | 3/2017 |

OTHER PUBLICATIONS

International Search Report, issued in Italian Patent Application No. IT 201800002048, dated Sep. 25, 2018; 9 pages.
Office Action issued in European Patent Application No. 19153463. 5-1009, dated Jul. 30, 2020; 8 pages.

\* cited by examiner

*Primary Examiner* — Joseph D. Pape
*Assistant Examiner* — Dana D Ivey
(74) *Attorney, Agent, or Firm* — Cantor Colburn LLP

(57) ABSTRACT

A car comprising a pair of front wheels, a pair of rear wheels, an outer body having a front hood and a front bumper, and a passenger compartment formed inside the outer body between the front and the rear wheels and frontally delimited by a windscreen connected with the front hood; the car being also provided with: an aerodynamic duct extending between an inlet opening formed through the front bumper and an outlet opening formed through the front hood to allow an ascending air flow during the travel of the car; and a wing-shaped profile positioned at the inlet opening and configured to increase the air suction effect by means of the duct during the travel of the car and to increase the front aerodynamic load on the car by acting as a spoiler.

11 Claims, 4 Drawing Sheets

CAR HAVING AN ENHANCED FRONT AERODYNAMIC LOAD

CROSS-REFERENCE TO RELATED APPLICATIONS

This Patent application claims priority from Italian Patent Application No. 102018000002048 filed on Jan. 26, 2018, the entire disclosure of which is incorporated herein by reference.

TECHNICAL FIELD

The present invention relates to a car having an enhanced front aerodynamic load.

PRIOR ART

In high-performance cars, aerodynamics is designed to generate a high aerodynamic downforce (i.e. a high downward aerodynamic thrust) while trying to minimize the aerodynamic resistance to advancement. As a result, the aerodynamic efficiency of a car is assessed based on the ratio between the aerodynamic downforce and the corresponding aerodynamic resistance to advancement: the higher the ratio, the greater the aerodynamic efficiency of the car.

In racing cars, the front aerodynamic load (i.e. the downward thrust generated by the aerodynamic effect and bearing on the front wheels) is enhanced by means of spoilers that are positioned in front of the bodywork near the road surface. However, high-performance cars that are homologated for normal road use are not allowed to use front spoilers (such as those used in races), as these front spoilers are quite incompatible with the safety requirements established by the homologation standards.

Presently, the front aerodynamic load in a high-performance car that may be homologated for normal road use can be changed by varying the height from the ground at the front axle or at the rear axle (by lowering the front axle if compared to the rear axle the front aerodynamic load is enhanced, and vice versa). However, although effective, this solution has several drawbacks, since it also changes the balance of the car in a completely unwanted manner.

Alternatively or in addition to the aforesaid measure, it is known to arrange on the front wheels arches diffusers configured to generate an upward movement of the air flow during the travel of the car.

However, this last solution tends to create unwanted resistance on the front wheel arches.

DESCRIPTION OF THE INVENTION

The object of the present invention is to provide a car that allows overcoming in a simple and inexpensive way the aforesaid drawbacks related to the cars of known type, and in particular showing with respect to these latter a lower aerodynamic resistance and a higher front downforce.

According to the present invention, a car is made as claimed in claim 1 and in the claims dependent thereon.

BRIEF DESCRIPTION OF THE DRAWINGS

The present invention will now be described with reference to the attached drawings showing a non-limiting embodiment, in which.

PREFERRED EMBODIMENTS OF THE INVENTION

Figure 1:
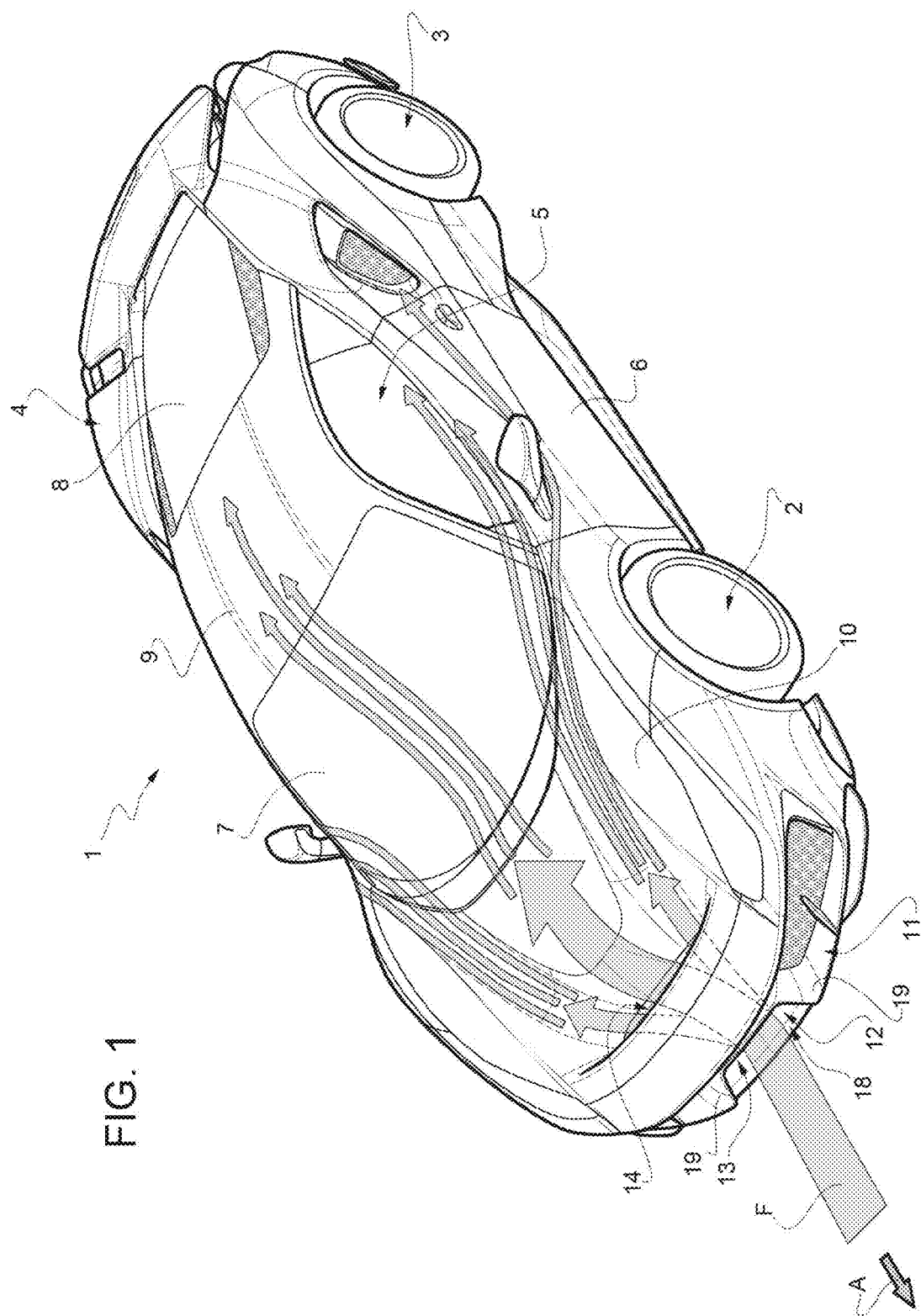
FIG. 1 shows in a perspective view a car according to the present invention, with some air flows formed during the travel.

FIG. 1 indicates as a whole with the reference number 1 a car having two front wheels 2 and two rear wheels 3 and comprising an outer body 4 and a passenger compartment 5, formed inside the outer body 4 between the front and the rear wheels 2, 3.

In particular, the passenger compartment 5 is accessed through two side doors 6 provided with windows. The passenger compartment 5 is therefore delimited by the doors 6, by a front windscreen 7, by a rear window 8 and by a roof 9.

The outer body 4 includes, among other things, a front hood 10 and a front bumper 11. The front hood 10 is connected at the front with the front bumper 11 and is connected at the rear with the windscreen 7.

The front hood 10 has a curved convex shape, increasing towards the windscreen 7.

As shown in the attached figures, the car 1 comprises an aerodynamic duct 12 extending between an inlet opening 13 formed through the front bumper 11 and an outlet opening 14 formed through the front hood 10, to allow an ascending air flow F, namely from the bottom upwards, during the travel of the car 1.

In practice, the duct 12 directly connects through calibrated sections the inlet opening 13 formed in the front bumper 11 and the outlet opening 14 formed in the front hood 10. The air flow F passing through the duct 12 allows, due to the variation of the momentum, generating a front aerodynamic load, namely increasing the downforce on the front part of the car 1. In other words, the air flow F passing through the duct 12 generates on the car 1 a downward thrust, which crushes the front part of the car 1 to the ground.

In particular, the duct 12 has, between the inlet openings and the outlet openings 14, a restricted section 15 (FIG. 4) having an area smaller than those of the inlet and outlet openings 13, 14. Consequently, the duct 12 has a progressively decreasing section from the inlet opening 13 to the restricted section 15, positioned substantially in an intermediate position along the duct 12, and a progressively increasing section from the aforesaid restricted section 15 to the outlet opening 14. Such configuration of the duct 12 allows an acceleration of the air flow F from the inlet opening 13 towards the outlet opening 14.

The duct 12 is preferably positioned before the two front wheels 3, i.e. before the space laterally delimited by the two front wheels 3.

Figure 2:
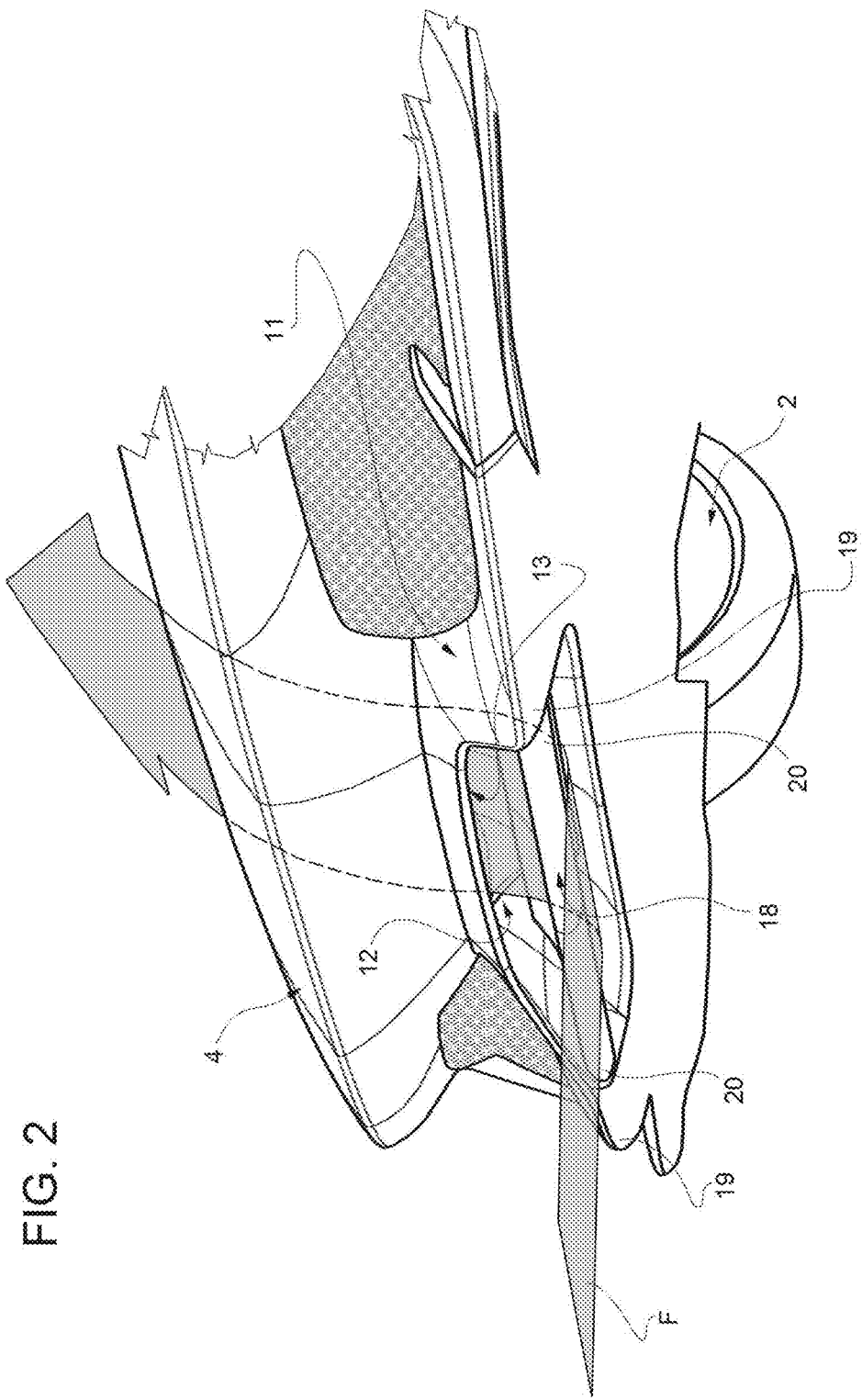
FIGS. 2 and 3 show, in two different perspective views and on an enlarged scale, a front portion of the car of FIG. 1, showing the same air flows shown in this latter figure.
Figure 3:
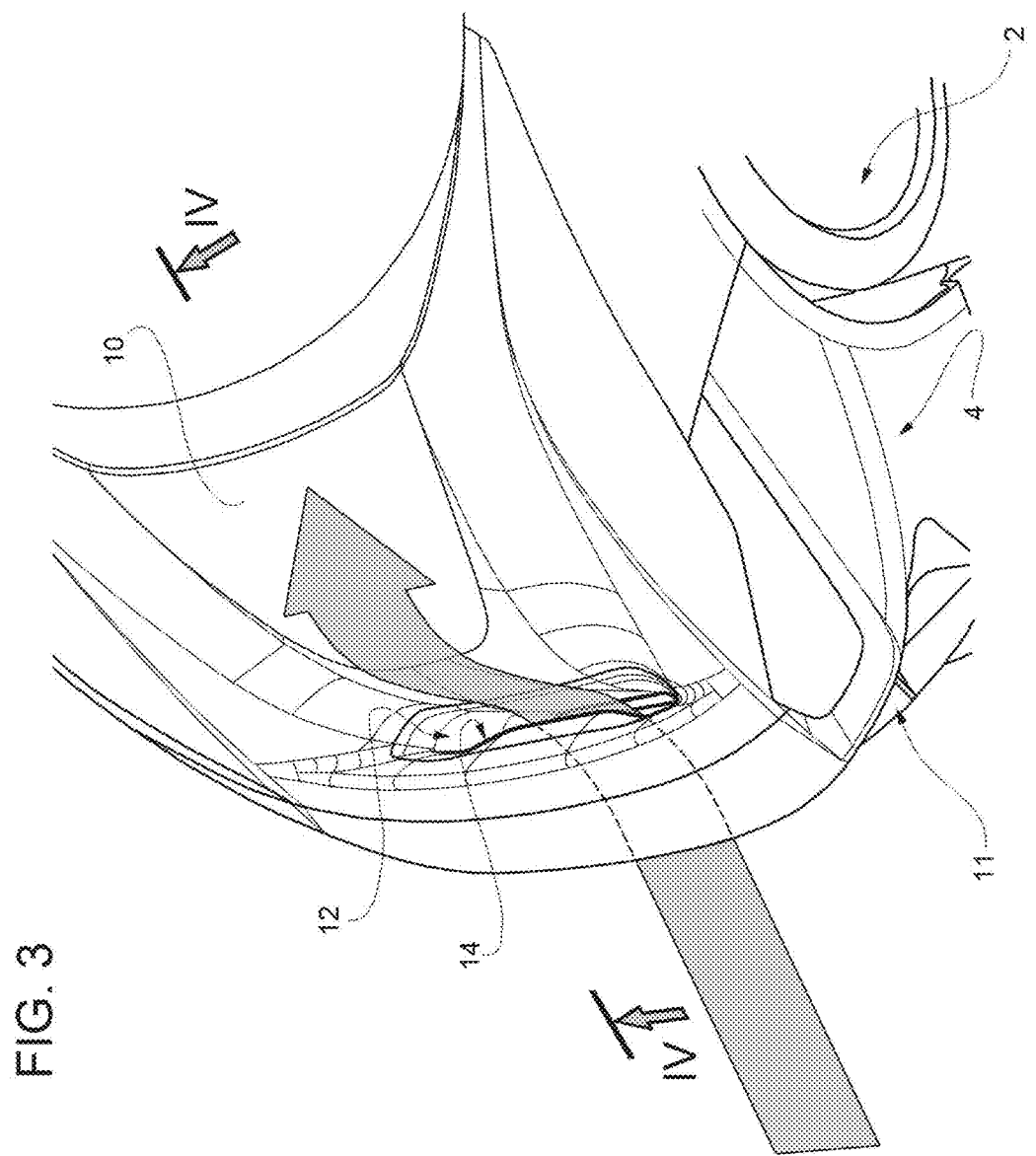
Figure 4:
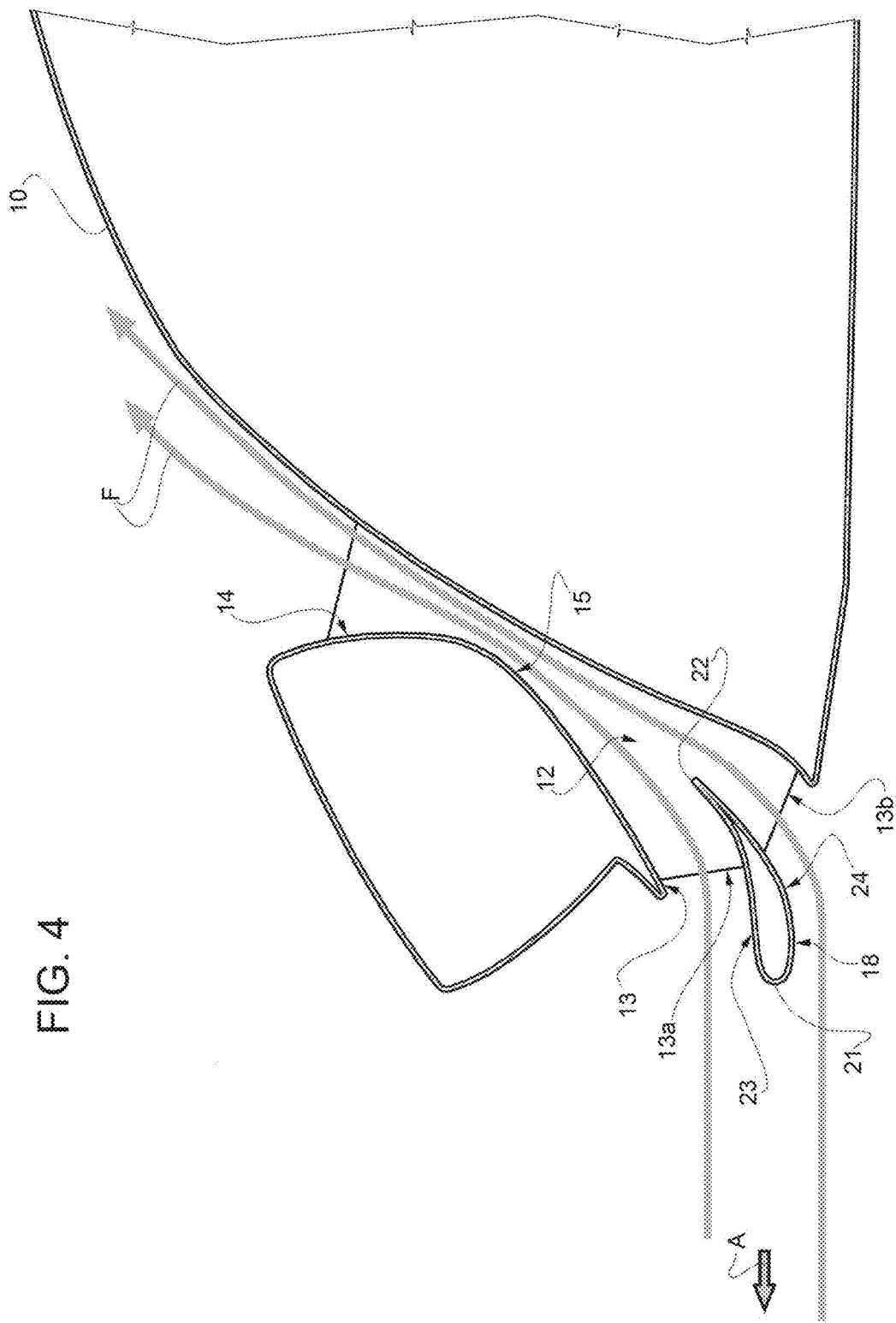
FIG. 4 is a section on an enlarged scale according to the line IV-IV of FIG. 3.

The duct 12 further extends in a central position with respect to the front hood 10 and to the front bumper 11. More in particular, the inlet opening 13 is frontally formed in the front bumper 11 and at a central portion thereof; the inlet opening 13 is also frontally oriented. The outlet opening 14 is formed in a portion of the front hood 10 included between the hood centreline and the front bumper 11. More precisely, the outlet opening 14 is formed in the front hood 10, close to a hood front edge adjacent to the front bumper 11. In this way, the outlet opening 14 opens onto a curved portion of the front hood 10, far away from the windscreen 7, which tends to increase the air suction effect from the bottom upwards through the duct 12. With reference to FIGS. 1, 2 and 4, the car 1 further comprises a wing-shaped profile 18 positioned at the inlet opening 13 and configured to increase the air suction effect by means of the duct 12 during the travel of the car 1 and to increase the front aerodynamic load on the car 1 by acting as a spoiler.

In particular, the wing-shaped profile 18 extends in a cantilever fashion between respective opposite side portions 19 of the front bumper 11 delimiting the inlet opening 13 on opposite sides. In other words, the wing-shaped profile 18 has opposite side ends 20 joined to the respective opposite side portions 19 of the front bumper 11.

Similarly to the duct 12 and to the inlet opening 13, the wing-shaped profile 18 also extends in a central position with respect to the front hood 10 and to the front bumper 11.

More in detail, the wing-shaped profile 18 extends in an inclined position with respect to a direction of travel A of the car 1 and has a leading edge 21 positioned at the front and at the bottom with respect to an outlet edge 22 of the wing-shaped profile 18.

The wing-shaped profile 18 extends partially at the front with respect to the inlet opening 13 and partially inside the duct 12 through the inlet opening 13 so as to divide this latter into two inlet sections 13a and 13b. In other words, the leading edge 21 of the wing-shaped profile 18 is positioned at the front of the inlet opening 13 and the trailing edge 22 is positioned inside the duct 12.

As shown in particular in FIG. 4, the wing-shaped profile 18 has a concave and upward-facing intrados 23 and a convex and downward-facing extrados 24.

From an examination of the characteristics of the car 1 manufactured according to the present invention, the advantages it provides are clear.

In particular, the car 1 described above has an excellent aerodynamic efficiency, since the ratio between the generated downforce and the aerodynamic resistance is quite favourable (i.e. is very high). The high aerodynamic efficiency is achieved thanks to the presence of the duct 12 and to the wing-shaped profile 18.

More specifically, by directly connecting the inlet opening 13 formed in the front bumper 11 with the outlet opening 14 formed in the front hood 10, the duct 12 allows an air flow F from the bottom upwards, which, due to the variation of the momentum, generates a front aerodynamic load, thus increasing the downforce on the front part of the car 1.

The wing-shaped profile 18 has a dual function:
it behaves like a real spoiler, since it is frontally positioned with respect to an open area, namely the inlet opening 13, and is cantilevered connected between the side portions 19 of the front bumper 11; and
it contributes to generate an acceleration of the air flow F towards the outlet opening 14, thus dividing the inlet opening 13 into two sections 13a, 13b.

The first function allows creating an aerodynamic load on the front part of the car 1 during the travel with a negligible effect on the aerodynamic resistance; the second function, favouring the acceleration of the air flow F through the duct 12, contributes to further increase the downforce on the front part of the car 1.

Moreover, the car 1 described above is easy and inexpensive to manufacture, since the making of the aerodynamic duct 12 and of the wing-shaped profile 18 requires the use of a few components of reduced weight and low cost.

Finally, it is clear that the car 1 here described and shown can be subjected to modifications and variations without thereby leaving the scope of protection defined by the appended claims.

The invention claimed is:

1. A car (1) comprising:
a pair of front wheels (2) and a pair of rear wheels (3);
an outer body (4) having a front hood (10) and a front bumper (11); and
a passenger compartment (5), formed inside said outer body (4) between said front and rear wheels (2, 3) and frontally delimited by a windscreen (7) that is connected with said front hood (10);
characterised in that it further comprises:
at least an aerodynamic duct (12) extending between an inlet opening (13) formed through said front bumper (11) and an outlet opening (14) formed through said front hood (10) to allow a flow (F) of ascending air during the travel of said car (1); and
a wing-shaped profile (18) positioned at said inlet opening (13) and configured to increase the air suction effect by said duct (12) during the travel of said car (1) and to increase the front aerodynamic load on the car (1) working as a spoiler.

2. The car according to claim 1, wherein said duct (12) has, between said inlet and outlet openings (13, 14), a narrowed section (15) having an area smaller than the areas of the inlet and outlet openings (13, 14).

3. The car according to claim 2, wherein said duct (12) has a section progressively decreasing from said inlet opening (13) to said narrowed section (15) and a section progressively increasing from said narrowed section (15) to said outlet opening (14).

4. The car according to claim 1, wherein said wing-shaped profile (18) extends in an inclined position with respect to a travel direction (A) of said car (1) and has a leading edge (21) positioned at the front and at the bottom with respect to a trailing edge (22) of the wing-shaped profile (18).

5. The car according to claim 4, wherein said leading edge (21) of said wing-shaped profile (18) is positioned at the front of said inlet opening (13) and said trailing edge (22) is positioned inside said duct (12).

6. The car according to claim 1, wherein said wing-shaped profile (18) extends in part at the front of said inlet opening (13) and in part inside said duct (12) through the inlet opening (13) so as to divide this latter into two inlet sections (13a, 13b).

7. The car according to claim 1, wherein said wing-shaped profile (18) has a concave and upward-facing intrados (23) and a convex and downward-facing extrados (24).

8. The car according to claim 1, wherein said front hood (10) has a convex curved shape, increasing towards said windscreen (7), and wherein said outlet opening (14) is formed in a portion of said front hood (10) included between its centreline and said front bumper (11).

9. The car according to claim 8, wherein the outlet opening (14) is formed in said front hood (10), close to its front edge adjacent to said front bumper (11).

10. The car according to claim 1, wherein said wing-shaped profile (18) extends in a cantilever fashion between respective side portions (19) opposite said front bumper (11) and delimiting said inlet opening (13) on opposite sides.

11. The car according to claim 1, wherein said duct (12) and said wing-shaped profile (18) extend centrally with respect to said front hood (10) and to said front bumper (11).

* * * * *